United States Patent
Terada (10) Patent No.: US 11,104,372 B2
(45) Date of Patent: Aug. 31, 2021

(54) VEHICLE STEERING DEVICE (71) Applicant: SHOWA CORPORATION, Gyoda (JP)

(72) Inventor: Norifumi Terada, Tochigi (JP)

(73) Assignee: SHOWA CORPORATION, Gyoda (JP)

(*) Notice: Subject to any disclaimer, the term of this patent is extended or adjusted under 35 U.S.C. 154(b) by 49 days.

(21) Appl. No.: 16/609,661

(22) PCT Filed: Jun. 29, 2017

(86) PCT No.: PCT/JP2017/023866
§ 371 (c)(1),
(2) Date: Oct. 30, 2019

(87) PCT Pub. No.: WO2019/003370
PCT Pub. Date: Jan. 3, 2019

(65) Prior Publication Data
US 2020/0070870 A1 Mar. 5, 2020

(51) Int. Cl.
B62D 3/12 (2006.01)
B62D 1/19 (2006.01)
(Continued)

(52) U.S. Cl.
CPC ............ B62D 3/126 (2013.01); B62D 1/19 (2013.01); B62D 5/001 (2013.01); F16F 7/126 (2013.01)

(58) Field of Classification Search
CPC . B62D 3/126; B62D 3/12; B62D 1/19; B62D 5/001; F16F 7/126
See application file for complete search history.

(56) References Cited

U.S. PATENT DOCUMENTS 9,156,493 B1 * 10/2015 Kimijima ............... B62D 3/126
10,118,640 B2 * 11/2018 Ogata ........................ F16F 3/10
(Continued)

FOREIGN PATENT DOCUMENTS

JP 58-118073 8/1983
JP 06-069061 9/1994
(Continued)

OTHER PUBLICATIONS

Khlystov et al. Uniaxial Tension and Compression Testing Materials. Massachusetts Institute of Technology [online], Sep. 25, 2013 [retrieved on Feb. 11, 2021], Retrieved from the Internet:< URL: http://web.mit.edu/dlizardo/www/UniaxialTestingLabReportV6.pdf (Year: 2013).*

(Continued)

Primary Examiner — Paul N Dickson
Assistant Examiner — Scott F. Underwood
(74) Attorney, Agent, or Firm — Rankin, Hill & Clark LLP (57) ABSTRACT A vehicle steering device includes a turning shaft movable in a vehicle widthwise direction, a housing that retains therein the turning shaft, a stopper provided at a shaft end of the turning shaft exposed from the housing, and a collision buffer member, which is provided at the housing, and which restricts a movable range of the stopper in the vehicle widthwise direction. The collision buffer member has an elastic region that absorbs an abutment load by a normal steering operation input from the stopper, and a plastic region that absorbs a shock load input from the stopper and greater than the abutment load by the normal steering operation.

2 Claims, 5 Drawing Sheets (51) Int. Cl.
  *B62D 5/00*   (2006.01)
  *F16F 7/12*   (2006.01)

(56) References Cited

U.S. PATENT DOCUMENTS

2006/0131828 A1* 6/2006 Tanaka .................... B62D 3/12
  280/93.514
2015/0158520 A1* 6/2015 Watanabe ............... F16F 7/095
  280/93.514

FOREIGN PATENT DOCUMENTS

| JP | 2011-111041 | | 6/2011 |
|----|-------------|---|--------|
| JP | 2014-136437 | | 7/2014 |
| JP | 2016-008003 | | 1/2016 |
| JP | 2016008003 A | * | 1/2016 |
| JP | 6242549 | | 12/2017 |

OTHER PUBLICATIONS

International Search Report, dated Aug. 15, 2017 (Aug. 15, 2017), 2 pages.
Decision to Grant a Patent, Date of Drafting: Oct. 20, 2017, 2 pages.
Notice of Reasons for Refusal, Date of Drafting: Aug. 8, 2017, 3 pages.
Written Opinion dated Oct. 12, 2017, 7 pages.

* cited by examiner

FIG.5D

VEHICLE STEERING DEVICE

TECHNICAL FIELD

The present disclosure relates to a vehicle steering device that includes a stopper provided at a shaft end of a turning shaft (e.g., a rack shaft), and a collision buffer member which eases collision of the stopper.

BACKGROUND ART

Vehicle steering devices that are generally and often utilized include a so-called rack-and-pinion type steering device that converts a rotation from a steering wheel into an axial motion of a rack shaft (turning shaft) by rack and pinion. The rack shaft is retained in a housing so as to be movable in a vehicle widthwise direction. A stopper (a rack end) is provided at a shaft end of the rack shaft. When the stopper collides slackly an elastic member (a collision buffer member) provided at an end of the housing, the movement of the rack shaft and that of the stopper are restricted. A vehicle steering device of this kind is disclosed in, for example, Patent Document 1.

The elastic member of the vehicle steering device disclosed in Patent Document 1 includes an annular rubber product through which an end of the rack shaft can pass. When the turning shaft is moved in the vehicle widthwise direction by a normal steering operation through the steering wheel, the stopper (the housing of a ball joint) abuts slackly the elastic member immediately before abutting an end of the housing, i.e., immediately before a stroke end. An abutment load acting on the elastic member at this time is small. The elastic member that deforms elastically absorbs and eases the abutment load.

CITATION LIST

Patent Literatures

Patent Document 1: JP H06-69061A (FIG. 5)

SUMMARY OF INVENTION

Technical Problem

For example, when a wheel to be turned by the steering wheel goes over a curb of a road, a large shock load in the axial direction acts on the turning shaft from the wheel. This shock load is transmitted from the stopper of the turning shaft to the elastic member. The shock load at this time is remarkably greater than the abutment load by a normal steering action. Hence, after the elastic member is compressed and deformed by a certain amount, the stopper abuts the end of the housing, and stops the movement in the axial direction. The shock load received by the entire steering device that includes the housing is large. It is preferable to reduce the shock load in view of enhancing the durability of the steering device. However, in order to reduce the shock load to at least a predetermined target value by the elastic member disclosed in. Patent Document 1, it is necessary to increase the deformable amount of the elastic member. This inevitably results in an increase in size of the elastic member.

An objective of the present disclosure is to provide a technology that can accomplish both the downsizing of a collision buffer member and the reduction of a shock load to be applied to a steering device.

Solution to Problem

According to the present disclosure, a vehicle steering device is provided which includes:
a turning shaft movable in a vehicle widthwise direction;
a housing that retains therein the turning shaft;
a stopper provided at a shaft end of the turning shaft exposed from the housing; and
a collision buffer member which is provided at the housing, restricts a movable range of the stopper in the vehicle widthwise direction, and has an elastic region that absorbs an abutment load by a normal steering operation input from the stopper, and a plastic region that absorbs a shock load input from the stopper and greater than the abutment load by the normal steering operation.

Preferably, the collision buffer member is formed of a material capable of both elastic deformation and plastic deformation.

Preferably, the collision buffer member is a cylindrical member in which the turning shaft is inserted so as to be movable in the vehicle widthwise direction.

Preferably, the above vehicle steering device further includes an elastic member which surrounds an outer circumference of the collision buffer member and which is provided on the housing,
wherein a tip surface of the elastic member faces the stopper 51 in the vehicle widthwise direction.

Preferably, a tip surface of the collision buffer member is in a same plane as a tip surface of the elastic member in the vehicle widthwise direction, or protrudes toward the stopper beyond the tip surface of the elastic member.

Advantageous Effects of Invention

According to the present disclosure, the collision buffer member provided at the housing restricts the movable range of the stopper provided at the shaft end of the turning shaft in the vehicle widthwise direction. When the turning shaft moves to the movable limit in the vehicle widthwise direction by a normal steering operation, the stopper slackly abuts the collision buffer member. At this time, the abutment load by the normal operation is input to the collision buffer member from the stopper. The collision buffer member absorbs this abutment load by the normal steering operation by the "elastic region".

In contrast, when the wheel goes over, for example, a curb of a road, a large shock load in the axial direction acts on the stopper from the wheel. Consequently, since the turning shaft moves in the vehicle widthwise direction, the stopper abuts the collision buffer member. The shock load at this time is greater than the abutment load by a normal steering operation. This shock load is input to the collision buffer member from the stopper. The collision buffer member absorbs this large shock load by the "plastic region". That is, because the collision buffer member plastically deforms to absorb the shock load, the shock load to be applied to the steering device can be reduced. In addition, the collision buffer member can be downsized in comparison with a structure in which a large shock load is absorbed by the "elastic region".

As described above, although the collision buffer member that can absorb the abutment load by the normal steering operation is compact, the shock load to be applied to the vehicle steering device can be remarkably reduced. Accordingly, the degree of freedom for arrangement of the vehicle steering device relative to the vehicle increases, and the durability of the vehicle steering device is enhanced.

DESCRIPTION OF EMBODIMENTS

Embodiments to carry out the present disclosure will be described below with reference to the accompanying figures.

Figure 1:
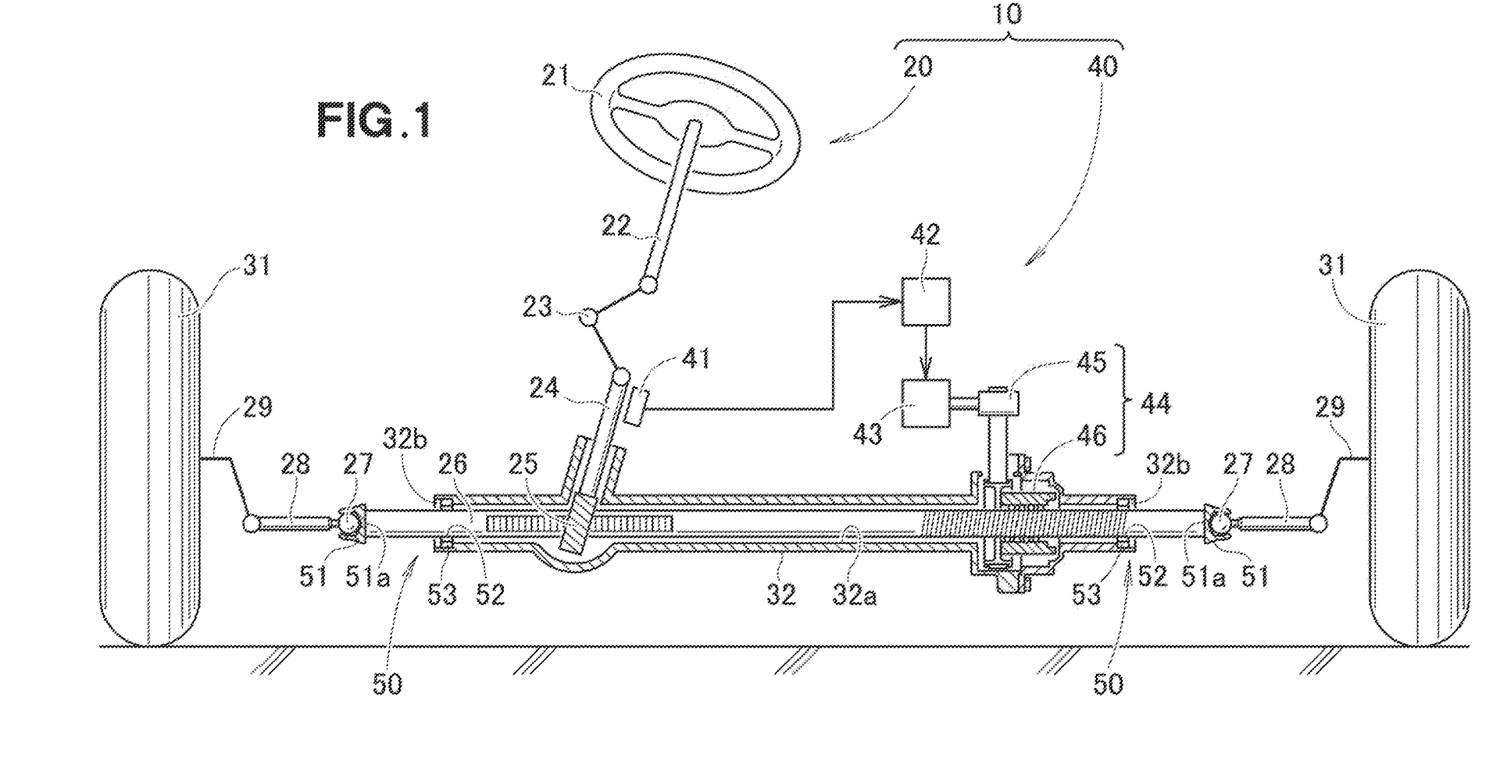
FIG. 1 is an exemplary diagram of a vehicle steering device according to the present disclosure.

As illustrated in FIG. 1, a vehicle steering device 10 includes a steering system 20 from a steering wheel 21 of a vehicle to wheels 31 and 31 (turning wheels 31 and 31), and an auxiliary torque mechanism 40 that adds auxiliary torque to this steering system 20.

The steering system 20 includes the steering wheel 21, a steering shaft 22 connected to this steering wheel 21, an input shaft 24 connected to this steering shaft 22 via a universal joint 23, a turning shaft 26 connected to this input shaft 24 via a first transmission mechanism 25, and the right and left (both sides in the vehicle widthwise direction) wheels 31 and 31 respectively connected to both ends of this turning shaft 26 via respective ball joints 27 and 27, respective tie rods 28 and 28, and respective spindles 29 and 29.

The first transmission mechanism 25 is, for example, a rack-and-pinion mechanism. The turning shaft 26 is retained in a housing 32 so as to be movable in the vehicle widthwise direction.

This housing 32 extends in the vehicle widthwise direction, and has a through-hole 32a that passes completely through in the vehicle widthwise direction, and openings 32b and 32b located at both ends, respectively, in the vehicle widthwise direction. These openings 32b and 32b are openings in a circular shape with a bottom which are concentric to the through-hole 32a, and have a larger diameter than that of the through-hole 32a.

The turning shaft 26 is movable in the vehicle widthwise direction within the through-hole 32a of the housing 32. Both ends of the turning shaft 26 protrude from both ends of the housing 32 in the vehicle widthwise direction, respectively. The ball joints 27 and 27 are provided at both ends of the turning shaft 26, respectively, in the lengthwise direction.

According to the steering system 20, when a driver turns the steering wheel 21, the right and left wheels 31 and 31 can be turned via the first transmission mechanism 25, the turning shaft 26, and the right and left tie rods 28 and 28 by steering torque.

The auxiliary torque mechanism 40 includes a steering torque sensor 41, a control unit 42, an electric motor 43, and a second transmission mechanism 44. The steering torque sensor 41 detects steering torque of the steering system 20 applied to the steering wheel 21. The control unit 42 generates a control signal based on a torque detection signal from the steering torque sensor 41. The electric motor 43 generates motor torque (auxiliary torque) in accordance with the above-described steering torque based on the control signal from the control unit 42. The second transmission mechanism 44 transmits the auxiliary torque generated by the electric motor 43 to the above-described turning shaft 26, and includes, for example, a belt-type transmission mechanism 45 and a ball screw 46.

According to this vehicle steering device 10, the wheels 31 and 31 can be turned via the turning shaft 26 by combination torque that is the steering torque by the driver to which the auxiliary torque by the electric motor 43 is added.

The vehicle steering device 10 includes right and left (both sides in the vehicle widthwise direction) easing devices 50 and 50. The right and left easing devices 50 and 50 ease a collision load that is generated when the turning shaft 26 moves to a stroke end. The left easing device 50 will be representatively described below.

Figure 2:
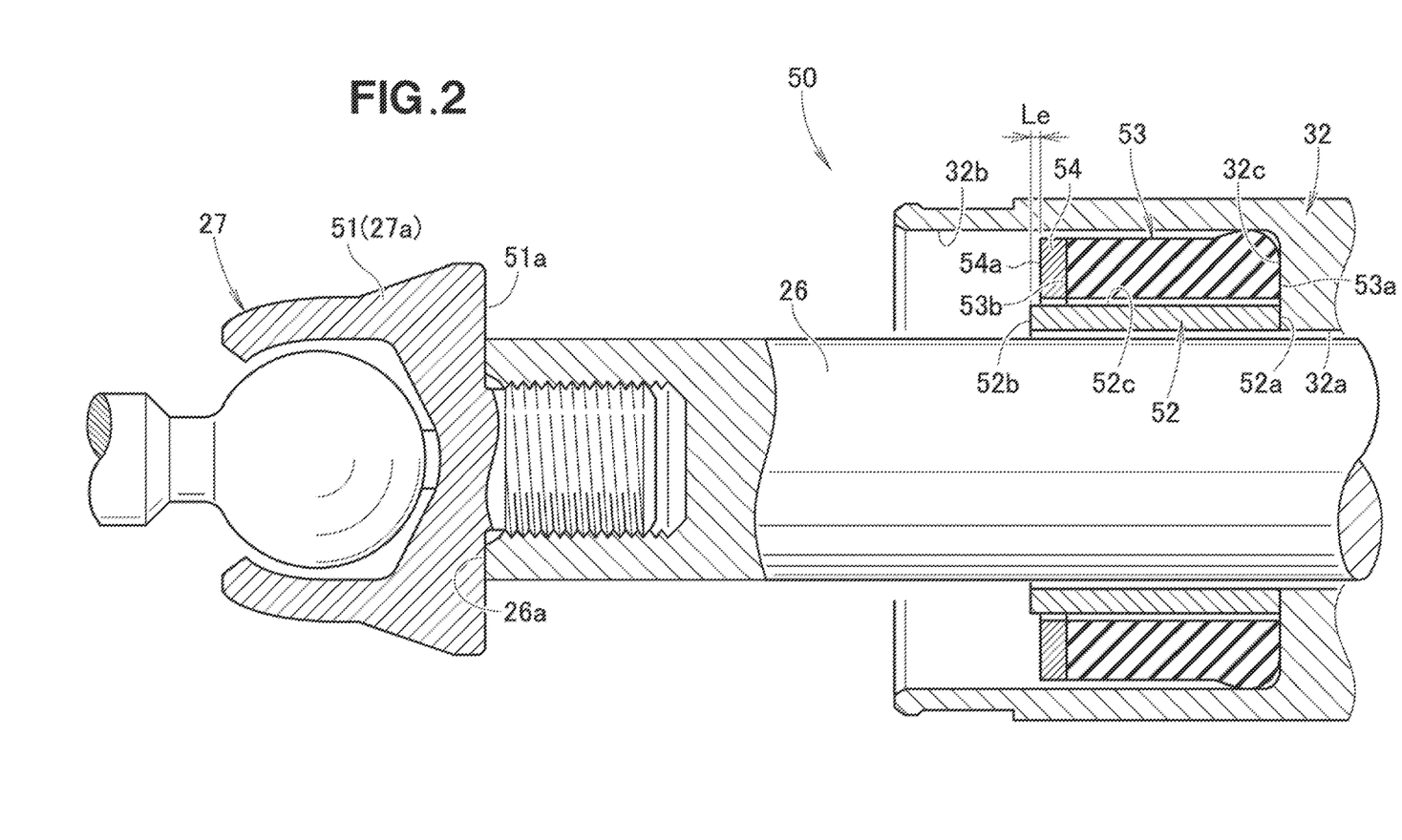
FIG. 2 is a cross-sectional view of an easing device and a stopper both illustrated in FIG. 1.

As illustrated in FIG. 2, the easing device 50 includes a stopper 51, a collision buffer member 52, and an elastic member 53.

The stopper 51 is provided at a shaft end 26a of the turning shaft 26 exposed from the housing 32, and is, for example, a holder 27a (also referred to as a joint housing 27a) of the ball joint 27. This tool holder 27a can move forward or retract relative to the opening 32b of the housing 32. An end surface 51a of the stopper 51 is a flat surface orthogonal to the turning shaft 26, and faces the opening 32b of the housing 32.

The collision buffer member 52 is a cylindrical (circular cylinder) component through which the turning shaft 26 is inserted so as to, be movable in the vehicle widthwise direction, and is provided in the opening 32b of the housing 32. This collision buffer member 52 restricts the movable range of the stopper 51 in the vehicle widthwise direction. A first surface 52a of the collision buffer member 52 is a flat surface in contact with a bottom surface 32c of the opening 32b. A second surface 52b (tip surface 52b) of the collision buffer member 52 is a flat surface that faces the end surface 51a of the stopper 51. That is, the tip surface 52b of the collision buffer member 52 faces the stopper 51 in the vehicle widthwise direction.

The collision buffer member 52 is formed of a material capable of both "elastic deformation" and "plastic deformation". For example, the collision buffer member 52 is formed of a resin material or a metal material. Example resin materials are polyamide (PA) resin, polyphenylene sulfide (PPS) resin, polyether sulfone (PES) resin, polyamide imide (PAI) resin, polyether imide (PEI) resin, polyether ether ketone (PEEK) resin, polyacetal (POM) resin, polyethylene terephthalate (PET) resin, and polypropylene (PP) resin.

The elastic member 53 surrounds an outer circumference 52c of the collision buffer member 52, and is provided in the opening 32b of the housing 32. This elastic member 53 is formed of an elastic material, such as a urethane resin or a rubber, and is formed in a circular cylinder shape. A first surface 53a of the elastic member 53 is a flat surface in contact with a bottom surface 32c of the opening 32b. A second surface 53b (tip surface 53b) of the elastic member 53 is a flat surface that faces the end surface 51a of the stopper 51. That is, the tip surface 53b of the elastic member 53 faces the stopper 51 in the vehicle widthwise direction.

An annular plate 54 formed of a metal is fastened to the tip surface 53b of the elastic member 53. This tip surface 53b is protected from the exterior by being covered by the annular plate 54. The stopper 51 abuts the tip surface 53b of the elastic member 53 via the annular plate 54. Note that the annular plate 54 may be provided in accordance with a necessity.

The tip surface 52b of the collision buffer member 52 may be provided in the same plane relative to the tip surface 53b of the elastic member 53 in the vehicle widthwise direction or protrudes toward the stopper 51 beyond the tip surface 53b of the elastic member 53 in the vehicle widthwise direction.

Note that according to the structure in which the annular plate 54 is provided on the elastic member 53, the following action is achieved. That is, the tip surface 52b of the collision buffer member 52 is set to be in the same plane as the tip surface 54a of the annular plate 54 in the vehicle widthwise direction, or protrudes by a protruding length Le in the vehicle widthwise direction toward the stopper 51 beyond the tip surface 54a of the annular plate 54. This protruding length Le is set to cause the end surface 51a of the stopper 51 to abut the tip surface 54a of the annular plate 54 when a distortion amount of the collision buffer member 52 increases to the upper limit or to near the upper limit of an elastic region.

Next, a case in which the collision buffer member 52 is formed of a resin material will be described with reference to FIG. 3.

Figure 3:
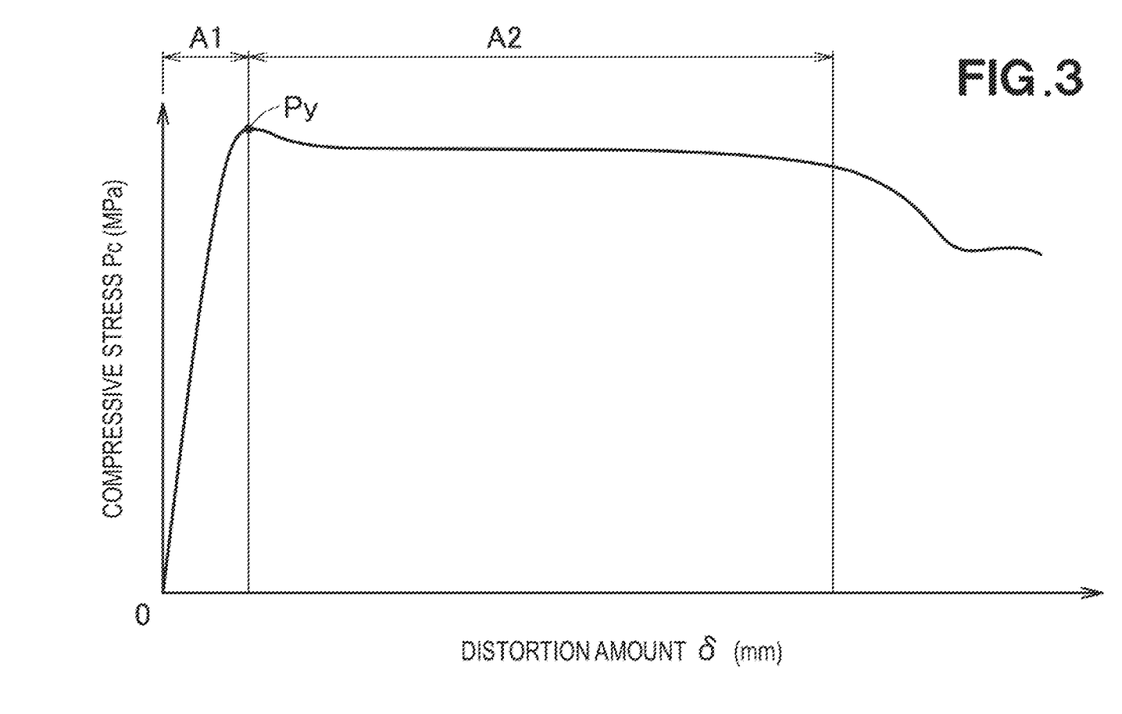
FIG. 3 is a diagram for a compressive stress-distortion curve of a collision buffer member illustrated in FIG. 2.

FIG. 3 is a compressive stress-distortion curve diagram of a resin material, has a vertical axis representing a compressive stress Pc caused in the resin material, and has a horizontal axis representing a distortion amount δ of the resin material, thereby representing characteristics of the distortion amount relative to the compressive stress. As is clear from FIG. 3, the characteristics of the resin material are substantially linear that increases from the origin within an elastic region A1 (elastic range A1). Hence, the collision buffer member 52 (see FIG. 2) deforms elastically.

The characteristics of the resin material transitions to a plastic region A2 when reaching an upper limit Py of the elastic region A1, i.e., a characteristic change point Py (upper breakdown point Py). In the plastic region A2 (a plastic range A2) beyond the elastic region A1, characteristics such that the compressive stress does not increase but the distortion amount increases, i.e., characteristics that have plastic deformation are obtained. Since the distortion amount δ becomes excessive when exceeding the plastic region A2, the resin material is damaged or fractured.

In view of the foregoing, the collision buffer member 52 has the characteristics that are both the elastic region A1 and the plastic region A2.

Note that among the metal materials applicable for the collision buffer member 52, it is known that there are some materials that have no clear breakdown point, such as an aluminum alloy, a copper alloy, and austenitic stainless steel, and such materials have characteristics which gradually deforms plastically from the elastic region.

The inventor of the present application prepared the following five samples Sp1 to Sp5 that employ a structure applicable as the collision buffer member, and carried out tests of applying a shock load (compressive load) in the axial direction to each of these samples Sp1 to Sp5. Next, a transition on data on the shock load of each sample Sp1 to Sp5 and that of a shock applying time were compared. However, the input conditions to apply the shock loads to the respective samples Sp1 to Sp5 were all uniform.

The samples Sp1 to Sp4 were formed of a rubber. The fifth sample Sp5 was formed of a resin material.

The first sample Sp1 had the smallest outer diameter, and the shortest overall length.

In comparison with the first sample Sp1, the second sample Sp2 had the outer diameter that was 1.2 times, and had the overall length that was 1.5 times.

In comparison with the first sample Sp1, the third sample Sp3 had the outer diameter that was 1.2 times, and had the overall length that was 2.1 times.

The fourth sample Sp4 employed a structure in which the two first samples Sp1 were arranged substantially in series and integrated with each other. This fourth sample Sp4 had the outer diameter that was 1.2 times as much as that of the first sample Sp1.

The fifth sample Sp5 had substantially equal size to the first sample Sp1.

Figure 4:
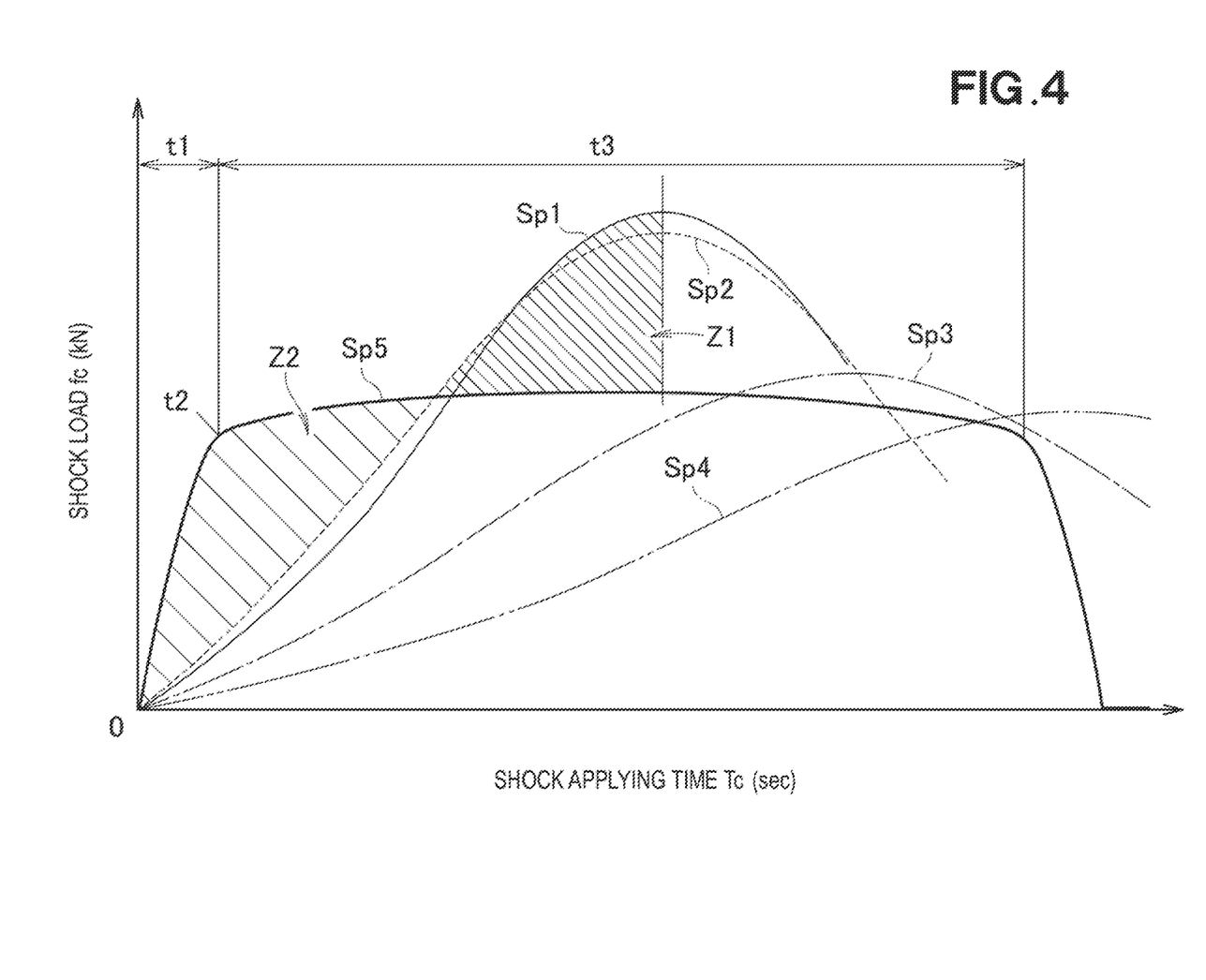
FIG. 4 is a correlation diagram between a shock load and a shock applying time of the easing device illustrated in FIG. 2.

A comparison result of data on each sample Sp1 to Sp5 is indicated in FIG. 4. FIG. 4 is a correlation diagram for a shock load and a shock applying time, has the vertical axis representing a shock load fc, and has the horizontal axis representing a shock applying time tc, thereby indicating a transition in the shock applying time and in the shock load.

The data on the first sample Sp1 is represented by a thin continuous line.

The data on the second sample Sp2 is represented by a thin dashed line.

The data on the third sample Sp3 is represented by a thin dashed-dotted line.

The data on the fourth sample Sp4 is represented by a thin dashed-two dotted line.

The data on the fifth sample Sp5 is represented by a thick continuous line.

According to those pieces of data, when the four samples Sp1 to Sp4 which are a rubber product are compared, the smaller the sample is, the larger the maximum value of the shock load fc becomes, and the larger the sample is, the smaller the maximum value of the shock load fc becomes. In view of the foregoing results, in order to decrease the maximum value of the shock load fc to a desired target value, it is necessary to adopt the large-size collision buffer member 52 (see FIG. 2). In the case of the large-size collision buffer member 52, the amount of elastic deformation in the compression direction becomes large, and thus the shock load fc can be reduced. However, this cannot achieve both the downsizing of the collision buffer member 52 and the reduction of the shock load to be applied to the steering device 10 (see FIG. 1).

Accordingly, what the inventor of the present application focused is that "if an input condition of the shock load fc is constant, the total amount of shock energy remains unchanged. Accordingly, it is suitable to shift a zone Z1 near the maximum value of the shock load fc in the characteristics of the first and second samples Sp1 and Sp2 toward the initial stage of the shock applying time tc". Next, the inventor of the present application reached a devisal to absorb shock energy so as to be divided into two stages by re-considering the material of the collision buffer member 52. More specifically, first, the shock load fc is keenly increased within a quite short time at an initial input stage t1 (a first stage t1). In order to accomplish this, it is appropriate to select a material that has a higher rigidity. In a subsequent second stage t3, the increase of the shock load fc is reduced. In order to accomplish this, it is appropriate to cause a breakdown of the high-rigid material by the shock load fc so as to dissipate the rigidity of the material.

Hence, the material that can perform both elastic deformation and plastic deformation is selected. One of such materials is a resin material. The compressive stress-distortion characteristic of this resin material is as described above with reference to FIG. 3.

As described above, the fifth sample Sp5 is formed of a resin material. Regarding the characteristics of this fifth sample Sp5 as illustrated in FIG. 4 by a thick continuous line, first, in the initial input stage t1 (the first stage t1) of the shock load fc, the shock load fc keenly increases within a quite short time in comparison with the four samples Sp1 to Sp4 which are a rubber product. The characteristics in the first stage t1 correspond to the elastic region A1 illustrated in FIG. 3. A completion time t2 of the first stage t1 correspond to the upper breakdown point Py illustrated in FIG. 3. The maximum value of the shock load fc according to the fifth sample Sp5 at this completion time t2 is remarkably reduced in comparison with the maximum values of the shock load fc of the first and second sample Sp1 and Sp2. In the second stage t3 after the completion time t2 of the first stage t1, the increase of the shock load fc decreases. That is, the characteristics of the fifth sample Sp5 in the second stage t3 change to flat characteristics. The characteristics of the second sage t3 correspond to the plastic region A2 as illustrated in FIG. 3.

Consequently, the zone Z1 near the maximum value of the shock load fc in the characteristics of first and second samples Sp1 and Sp2 can be shifted to the initial stage of the shock applying time tc like the zone Z2 of the shock load fc in the characteristics of the fifth sample Sp5. Accordingly, the shock energy can be divided into two stages, and can be absorbed. In addition, the fifth sample Sp5 can accomplish downsizing in comparison with the four samples Sp1 to Sp4 which are a rubber product.

Next, an action of the easing device 50 will be described with reference to FIGS. 5A to 5D.

Figure 5A:
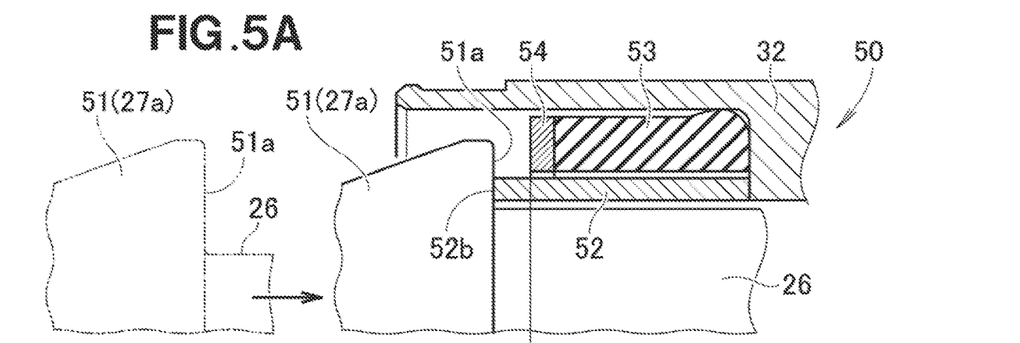
FIGS. 5A to 5D are each an action diagram of the easing device illustrated in FIG. 2.
Figure 5B:
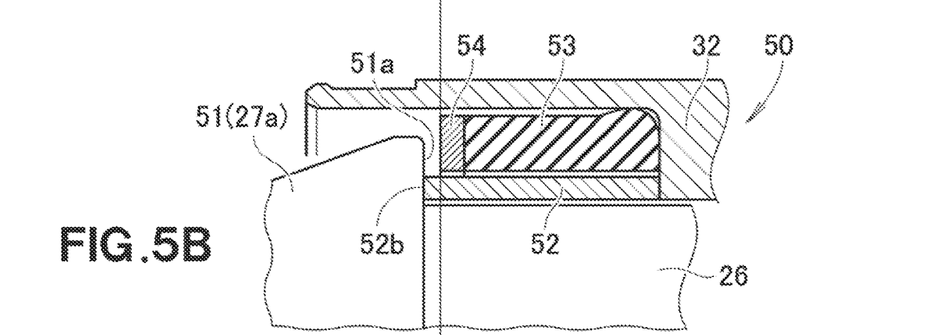

Presently, as illustrated by a virtual line in FIG. 5A, the stopper 51 is in a position away from the tip surface 52b of the collision buffer member 52. Next, the turning shaft 26 moves toward the center in the vehicle widthwise direction by a so-called normal steering operation originating from turning of the steering wheel 21 (see FIG. 1) and/or a drive by the electric motor 43. As is indicated by a solid line in FIG. 5A, when the turning shaft 26 moves toward the center and to the movement limit (stroke end) in the vehicle widthwise direction, the end surface 51a of the stopper 51 gently abuts the tip surface 52b of the collision buffer member 52. At this time, the abutment load by a normal steering operation is input to the tip surface 52b of the collision buffer member 52 from the end surface 51a of the stopper 51. Consequently, as illustrated in FIG. 5B, the collision buffer member 52 absorbs the abutment load by the normal steering operation by elastic deformation, i.e., the elastic region.

Subsequently, when the turning shaft 26 moves toward the external side in the vehicle widthwise direction, as is indicated by the virtual line in FIG. 5A, the end surface 51a of the stopper 51 moves apart from the tip surface 52b of the collision buffer member 52. Consequently, the tip surface 52b of the collision buffer member 52 returns to the original position by the own elasticity.

Moreover, as illustrated by a virtual line in FIG. 5A, with the stopper 51 being apart from the tip surface 52b of the collision buffer member 52, when the wheel 31 (see FIG. 1) goes over a curb of a road, etc., a large shock load in the axial direction acts on the stopper 51 from the wheel 31. Consequently, as illustrated in FIG. 5A by the solid line, the end surface 51a of the stopper 51 abuts the tip surface 52b of the collision buffer member 52. A shock load at this time is greater than the abutment load by the normal steering operation. This shock load is input to the tip surface 52b of the collision buffer member 52 from the end surface 51a of the stopper 51.

Figure 5C:
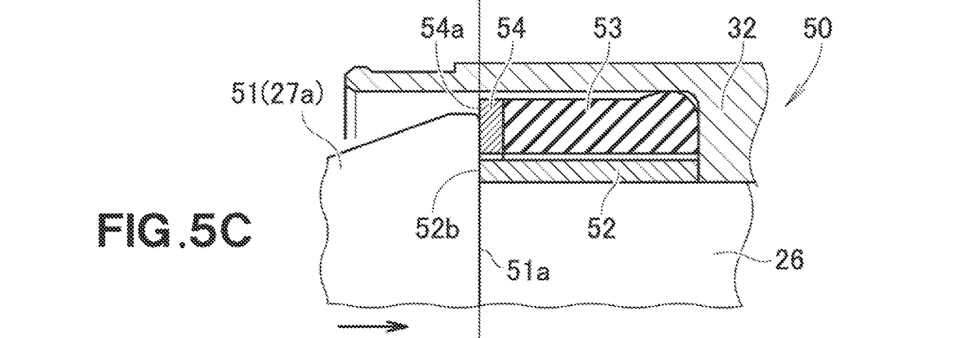

As illustrated in FIG. 5C, the collision buffer member 52 elastically deforms largely to the position of the tip surface 54a of the annular plate 54 or to a nearby location thereto by the shock load. Furthermore, the collision buffer member 52 enters the plastic region beyond the upper limit of the elastic region. In this plastic region, characteristics such that a distortion amount increases without an increase in compressive stress, i.e., a so-called plastic deformation is accomplished.

Figure 5D:
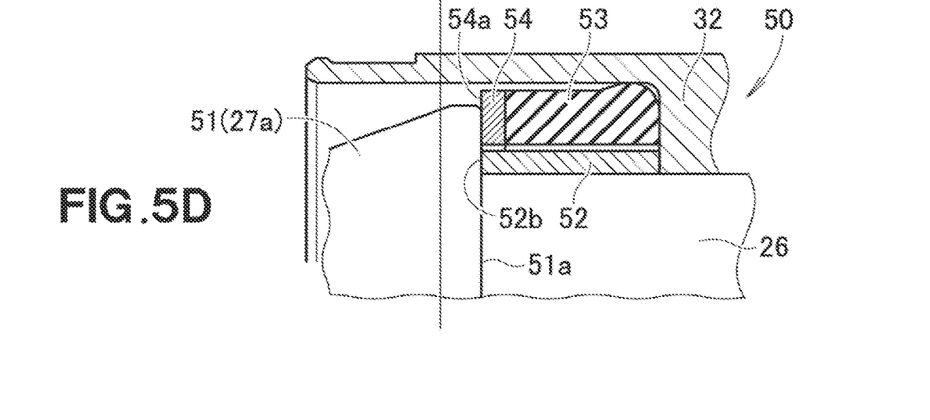

Moreover, as illustrated in FIG. 5C, when the distortion amount of the collision buffer member 52 increases to the upper limit of the elastic region or to near the upper limit, the end surface 51a of the stopper 51 abuts not only the tip surface 52b of the collision buffer member 52 but also the tip surface 54a of the annular plate 54. Hence, in the plastic region, the shock load is also input to the tip surface 54a of the annular plate 54 from the end surface 51a of the stopper 51. The elastic member 53 absorbs the shock load by elastic deformation. That is, as illustrated in FIG. 5D, when the collision buffer member 52 plastically deforms in the compression direction, the collision buffer member 52 and the elastic member 53 are compressed and deformed simultaneously. Consequently, the compression deformation amount of the collision buffer member 52 is suppressed, thereby preventing the collision buffer member 52 from being damaged or from being fractured.

The followings are the summary of the above description.

As illustrated in FIG. 1 and FIG. 2, a vehicle steering device 10 includes:

a turning shaft 26 movable in a vehicle widthwise direction;

a housing 32 that retains therein the turning shaft 26;

a stopper 51 provided at a shaft end 26a of the turning shaft 26 exposed from the housing 32; and a collision buffer member 52 which is provided at the housing 32, restricts a movable range of the stopper 51 in the vehicle widthwise direction, and has an elastic region that absorbs an abutment load by a normal steering operation input from the stopper 51, and a plastic region that absorbs a shock load input from the stopper 51 and greater than the abutment load by the normal steering operation.

When the turning shaft 26 moves to the movement limit in the vehicle widthwise direction by the normal steering operation, the stopper 51 gently abuts the collision buffer member 52. At this time, the abutment load by the normal steering operation is input to the collision buffer member 52 from the stopper 51. The collision buffer member 52 absorbs the abutment load by this normal steering operation by the "elastic region".

In contrast, when the wheel 31 goes over, for example, a curb of a road, a large shock load in the axial direction acts on the stopper 51 from the wheel 31. Consequently, since the turning shaft 26 moves in the vehicle widthwise direction, the stopper 51 abuts the collision buffer member 52. The shock load at this time is greater than the abutment load by the normal steering operation. This shock load is input to the collision buffer member 52 from the stopper 51. The collision buffer member 52 absorbs this large shock load by the "plastic region". That is, because the collision buffer member 52 plastically deforms to absorb the shock load, the shock load to be applied to the steering device 10 can be reduced. In addition, the collision buffer member 52 can be downsized in comparison with a structure in which a large shock load is absorbed by the "elastic region".

As described above, although the collision buffer member 52 that can absorb the abutment load by the normal steering operation is compact, the shock load to be applied to the vehicle steering device 10 can be remarkably reduced. Accordingly, the degree of freedom for arrangement of the vehicle steering device 10 relative to the vehicle increases, and the durability and maneuverability of the vehicle steering device 10 are enhanced.

For example, a keen load that acts on the first and second transmission mechanisms 25 and 44 and the electric motor 43 can be suppressed. In addition, since a keen increase in steering torque of the steering system 20 can be suppressed, a stable maneuverability is ensured. A sufficient response of the control unit 42 that controls the electric motor 43 is also ensured.

Furthermore, the collision buffer member 52 is formed of a material capable of both elastic deformation and plastic deformation. Hence, characteristics different from each other that are an elastic region and a plastic region can be easily achieved by a single component.

Still further, the collision buffer member 52 is a cylindrical member in which the turning shaft 26 is inserted so as to be movable in the vehicle widthwise direction. Hence, a load input from the stopper 51 provided at the shaft end 26a of the turning shaft 26 can be efficiently received across the entire circumference of the cylindrical collision buffer member 52.

Yet still further, the vehicle steering device 10 further includes an elastic member 53 which surrounds an outer circumference 52c of the collision buffer member 52 and which is provided on the housing 32. The tip surface 53b of this elastic member 53 faces the stopper 51 in the vehicle widthwise direction. Hence, when the collision buffer member 52 plastically deforms, the collision buffer member 52 and the elastic member 53 simultaneously compressed and deformed. Consequently, the compression deformation amount of the collision buffer member 52 is suppressed, thereby preventing the collision buffer member 52 from being damaged or fractured.

Moreover, the tip surface 52b of the collision buffer member 52 is in the same plane as the tip surface 53b of the elastic member 53 (when there is the annular plate 54, the tip surface 54a thereof) in the vehicle widthwise direction, or protrudes toward the stopper 51 beyond the tip surface 53b of the elastic member 53.

When the tip surface 52b of the collision buffer member 52 is in the same plane as the tip surface 53b of the elastic member 53 (the tip surface 54a of the annular plate 54) in the vehicle widthwise direction, the collision buffer member 52 and the elastic member 53 receive a shock load from the stopper 51 and are simultaneously compressed and deformed.

The elastic member 53 acts on the compression deformation characteristics of the collision buffer member 52 in both the elastic region and the plastic region of the collision buffer member 52.

In contrast, when the tip surface 52b of the collision buffer member 52 protrudes in the vehicle widthwise direction beyond the tip surface 53b of the elastic member 53 (the tip surface 54a of the annular plate 54), the stopper 51 first compresses and deforms the collision buffer member 52 by what corresponds to this protrusion. The elastic member 53 acts on the compression deformation characteristics of the collision buffer member 52 in the plastic region of the collision buffer member 52.

Note that the vehicle steering device 10 according to the present disclosure is not limited to the embodiment as long as the action and effect of the present disclosure are achievable.

For example, according to the present disclosure, the vehicle steering device 10 may include only the steering system 20, and may be a so-called manual-type steering device that has no auxiliary torque mechanism 40.

Moreover, the vehicle steering device 10 may be a so-called steer by wire (steer-by-wire) type steering device which has the steering wheel 21 and the turning shaft 26 mechanically separated, causes a turning actuator (unillustrated) to produce turning force in accordance with a turned amount of the steering wheel 21, and transmits this turning force to the turning shaft 26.

INDUSTRIAL APPLICABILITY

The vehicle steering device 10 according to the present disclosure is suitable for a vehicle.

REFERENCE SIGNS LIST

10 Vehicle steering device
26 Turning shaft
26a Shaft end of turning shaft
32 Housing
51 Stopper
52 Collision buffer member
52b Tip surface
52c Outer circumference of collision buffer member 52
53 Elastic member
53b Tip surface

The invention claimed is:

1. A vehicle steering device comprising:
   a turning shaft that is movable in a vehicle widthwise direction;
   a housing that retains therein the turning shaft;
   a stopper provided at a shaft end of the turning shaft, which is exposed from the housing;
   a collision buffer member which is provided at the housing, which restricts a movable range of the stopper in the vehicle widthwise direction, and which has an elastic region and a plastic region in a compressive stress-distortion amount curve diagram that represents characteristics of a distortion amount relative to a compressive stress; and
   an elastic member, which surrounds an outer circumference of the collision buffer member and which is provided on the housing,
   wherein a tip surface of the elastic member faces the stopper in the vehicle widthwise direction;
   wherein an annular plate formed of a metal is fastened to the tip surface of the elastic member; and
   wherein a tip surface of the collision buffer member protrudes toward the stopper beyond the tip surface of the elastic member in a range where the collision buffer member and the elastic member are compressed and deformed simultaneously when the collision buffer member plastically deforms.

2. The vehicle steering device according to claim 1, wherein the collision buffer member is a cylindrical member in which the turning shaft is inserted so as to be movable in the vehicle widthwise direction.

* * * * *